Nov. 19, 1940.  A. C. E. WALLER  2,222,053
SPRING RING
Filed Feb. 26, 1940
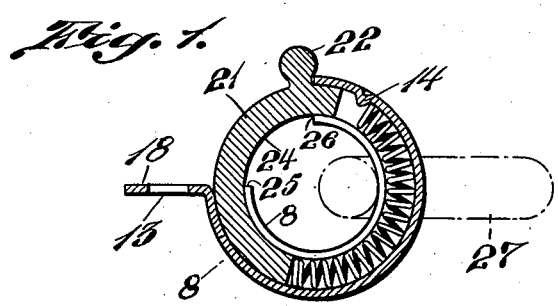
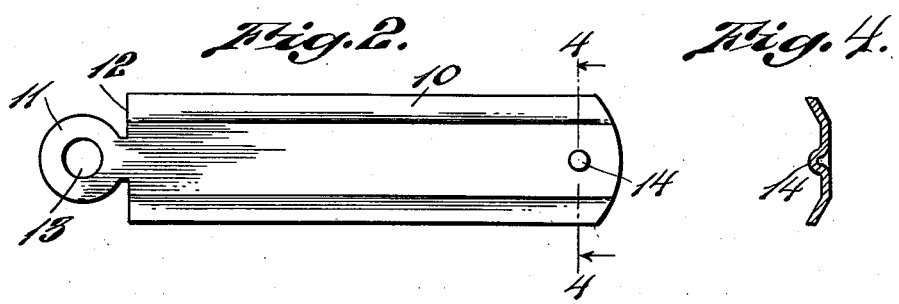
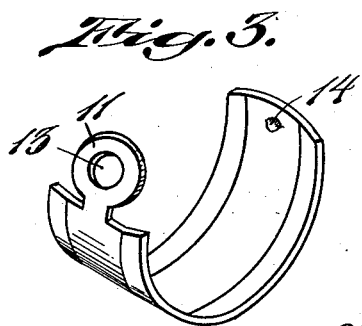
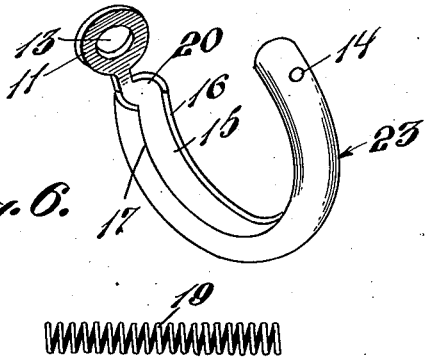
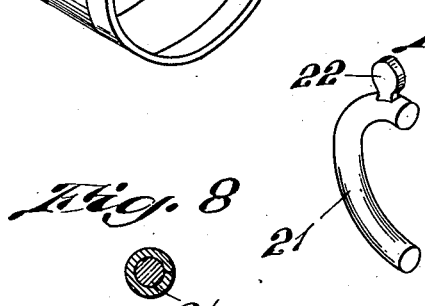
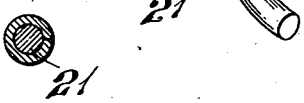
INVENTOR.
Anthony C. E. Waller
BY Barlow & Barlow
ATTORNEYS.

Patented Nov. 19, 1940

2,222,053

UNITED STATES PATENT OFFICE 2,222,053

SPRING RING

Anthony C. E. Waller, Warwick, R. I., assignor to A. E. Waller Company, Inc., a corporation of Rhode Island Application February 26, 1940, Serial No. 320,838

4 Claims. (Cl. 24—240)

This invention relates to a spring ring of the type used for connecting together the ends of a necklace chain or like article and the invention has for one of its objects to provide a structure which may be manufactured at a less cost than similar devices with which I am familiar.

A more specific object of the invention is to provide a spring ring structure complete with an attaching eye without any soldering operations.

Another object of the invention is to form a tubular body member and an attaching eye from a single piece of stock.

Another object of the invention is to locate the attaching eye so that the connection to the end of the chain will be supported a substantial distance inwardly from the free end of the outer tubular body and the closing slide bar so that strains on the slide bar will be avoided, and even though the slide bar be partially withdrawn, the chain will not immediately drop from engaged relationship.

With these and other objects in view, the invention consists of certain novel features of construction, as will be more fully described, and particularly pointed out in the appended claims.

In the accompanying drawing:

Fig. 1 is a sectional view of the complete ring illustrating in dotted lines the end link of a chain attached to the ring;

Fig. 2 is a top plan view of the body member as blanked out from sheet stock;

Fig. 3 is a perspective view showing the body member as rolled partially into finished position;

Fig. 4 is a section on line 4—4 of Fig. 2;

Fig. 5 is a perspective view showing a further step in the operation of rolling the body member toward finished position;

Fig. 6 is a perspective view of the slide bar or bolt;

Fig. 7 is an elevation of the spring used for operating the slide bar; and

Fig. 8 is a section on line 8—8 of Fig. 1.

In the use of spring rings it is quite customary for an attaching eye to be soldered to the outer tubular member of the ring for connection to some chain or the like to which it is desired that the ring be permanently attached; and in order that these parts may be formed of a single piece of material, I have formed an eye in the end of a blank and rolled the blank inwardly over the bolt to provide a tube and bent outwardly the eye whereby soldering operations are eliminated; and the following is a more detailed description of the present embodiment of this invention, illustrating the preferred means by which these advantageous results may be accomplished:

With reference to the drawing, 10 designates a blank of sheet stock cut out in the shape illustrated in Fig. 2, somewhat arcuate in cross section and with an eye 11 formed at the end 12 of this blank. A hole is pierced at 13 for permanent attachment to some chain or the like. There is also a detent abutment 14 struck in the stock as illustrated in Figs. 1, 2, 3, and 4. After the blank is thus formed, it is rolled lengthwise into the arc of a circle which comprises approximately 270° as illustrated in Fig. 3 and the slight arc of the stock formed in the blank 10 will be disposed so that the convex side is outward. This sheet stock is then further rolled as illustrated in Fig. 5 to provide a housing 15 with spaced edges 16 and 17, and the eye 11 will be bent outwardly as shown at 18 in Fig. 1.

A spring 19 is assembled through the end 20 of the tube and moved along the slot which is of a width sufficient so that the spring does not escape while the slide bar or bolt 21 shown in Fig. 6 is similarly placed through the end 20 while compressing the spring and then by a further striking operation the slot is closed and the spring and bolt 21 are assembled therein.

The bolt 21 is cut out from sheet stock to provide integral therewith a finger piece 22 and is disposed in an arc to conform to the arc of the tubular portion designated generally 23, and then by swaging, the cross section of this slide bar is formed circular. This bolt is of a length approximately 180° so that it will close the quarter circle of 90° as at 24 between the ends 25 and 26 of the tube.

When the assembly of the three parts, including the spring, is made, the bolt 21 may be retracted from the position shown in Fig. 1 by its being slid into the tube against the compression of the spring, one end of which engages the detent abutment 14 as clearly illustrated in Fig. 1. When the bolt is withdrawn, a link such as is illustrated in dotted lines at 27 may be inserted through the opening and then the bolt allowed to be closed by the spring and be there maintained in closed position. Any other link by suitable attachment may be placed through the pierced opening 13 and when a pull is exerted in opposite directions through the opening 13 and through the link 27, the entire strain will be borne by the tube which forms a hook extending through the 270° so that even if the bolt were withdrawn, if tension is applied in opposite directions on the chain from the point 13 and point 27, the hook shaped tubular portion of the ring will hold the parts in connected relationship.

The foregoing description is directed solely towards the construction illustrated, but I desire it to be understood that I reserve the privilege of resorting to all the mechanical changes to which the device is susceptible.

I claim:

1. In a spring ring, a tube of an arcuate extent greater than 180° and less than 360°, an attaching eye formed of the same piece of stock as said tube and extending outwardly radially therefrom at an end thereof, and an arcuate slide bar located in and guided by said tube.

2. In a spring ring, an arcuate tube of an arcuate extent greater than 180° and less than 360°, an attaching eye formed of the same piece of stock as said tube and extending outwardly radially therefrom at an end thereof, and an arcuate slide bar located in and guided by said tube and provided with a finger piece for telescoping said bar with reference to said tube.

3. In a spring ring, a tube of an arcuate extent greater than 180° and less than 360°, an attaching eye formed of the same piece of stock as said tube and extending outwardly radially therefrom at an end thereof, and an arcuate slide bar located in, and guided by said tube and provided with a finger piece for telescoping said bar with reference to said tube, and a spring in said tube urging said slide bar in one direction.

4. In a spring ring, an arcuate tube of an arcuate extent greater than 180° and less than 360°, an attaching eye formed of the same piece of stock as said tube and extending outwardly radially therefrom at an end thereof, and an arcuate slide bar located in, and guided by said tube contacting at one end thereof said bar and provided with a finger piece for telescoping said bar with reference to said tube, and a spring in said tube urging said slide bar in one direction, and a detent in said tube forming an abutment for one end of the spring.

ANTHONY C. E. WALLER.